United States Patent
Khlat

(10) Patent No.: US 9,935,670 B2
(45) Date of Patent: Apr. 3, 2018

(54) CARRIER AGGREGATION USING MULTIPLE ANTENNAS

(71) Applicant: RF Micro Devices, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 14/497,919

(22) Filed: Sep. 26, 2014

(65) Prior Publication Data

US 2015/0085708 A1 Mar. 26, 2015

Related U.S. Application Data

(60) Provisional application No. 61/882,671, filed on Sep. 26, 2013.

(51) Int. Cl.
| | |
|---|---|
| *H04B 1/44* | (2006.01) |
| *H04B 1/40* | (2015.01) |
| *H04L 5/14* | (2006.01) |
| *H04B 1/00* | (2006.01) |
| *H04B 15/00* | (2006.01) |
| *H04L 5/08* | (2006.01) |
| *H04B 7/0413* | (2017.01) |

(52) U.S. Cl.
CPC ............. *H04B 1/40* (2013.01); *H04B 1/0057* (2013.01); *H04B 15/00* (2013.01); *H04L 5/08* (2013.01); *H04L 5/14* (2013.01); *H04B 7/0413* (2013.01)

(58) Field of Classification Search
CPC .... H04L 5/08; H04L 5/14; H04B 1/44; H04B 1/401
See application file for complete search history.

(56) References Cited

U.S. PATENT DOCUMENTS

| | | |
|---|---|---|
| 3,656,162 A | 4/1972 | Mee |
| 3,946,328 A | 3/1976 | Boctor |
| 4,902,992 A | 2/1990 | Rubin et al. |
| 5,644,274 A | 7/1997 | Kaida |
| 5,774,193 A | 6/1998 | Vaughan |
| 6,333,591 B1 | 12/2001 | Yoshio et al. |
| 6,586,786 B2 | 7/2003 | Kitazawa et al. |

(Continued)

OTHER PUBLICATIONS

Non-Final Office Action for U.S. Appl. No. 14/498,991, dated Aug. 17, 2015, 13 pages.

(Continued)

*Primary Examiner* — Khaled Kassim
*Assistant Examiner* — Syed S Ali
(74) *Attorney, Agent, or Firm* — Withrow & Terranova, P.L.L.C.

(57) ABSTRACT

RF front-end circuitry, which includes RF switching and duplexing circuitry, a first RF diplexer, and a second RF diplexer, is disclosed. The RF switching and duplexing circuitry operates in one of a group of RF transmit modes, such that the group of RF transmit modes includes at least one transmit uplink carrier aggregation mode. The RF switching and duplexing circuitry provides at least one RF transmit signal based on the one of the group of RF transmit modes. The first RF diplexer is coupled between the RF switching and duplexing circuitry and a primary RF antenna. The second RF diplexer is coupled between the RF switching and duplexing circuitry and an auxiliary RF antenna.

20 Claims, 3 Drawing Sheets

(56) References Cited

U.S. PATENT DOCUMENTS

| | | | |
|---|---|---|---|
| 6,710,813 | B1 | 3/2004 | Grandchamp et al. |
| 6,980,067 | B2 | 12/2005 | Forrester et al. |
| 7,035,602 | B2 | 4/2006 | Satoh et al. |
| 7,078,987 | B1 | 7/2006 | Petrovic |
| 7,330,500 | B2 | 2/2008 | Kouki |
| 7,376,440 | B2 | 5/2008 | Forrester et al. |
| 7,546,091 | B2 | 6/2009 | Murakami et al. |
| 8,149,742 | B1 | 4/2012 | Sorsby |
| 8,314,653 | B1 | 11/2012 | Granger-Jones et al. |
| 8,385,871 | B2 | 2/2013 | Wyville |
| 8,552,816 | B2 | 10/2013 | Khlat |
| 8,634,029 | B2 | 1/2014 | Pugel |
| 8,849,217 | B2 | 9/2014 | Rousu et al. |
| 8,892,057 | B2 | 11/2014 | Khlat |
| 8,903,409 | B2 | 12/2014 | Winiecki et al. |
| 8,933,764 | B2 | 1/2015 | Khlat et al. |
| 9,118,376 | B2 | 8/2015 | Khlat et al. |
| 9,124,355 | B2 | 9/2015 | Black et al. |
| 2002/0053954 | A1 | 5/2002 | Shamsaifar et al. |
| 2002/0130734 | A1 | 9/2002 | Liang et al. |
| 2002/0137471 | A1 | 9/2002 | Satoh et al. |
| 2004/0189526 | A1 | 9/2004 | Frank |
| 2005/0020297 | A1 | 1/2005 | Axness et al. |
| 2005/0195047 | A1 | 9/2005 | Park et al. |
| 2005/0239421 | A1 | 10/2005 | Kim et al. |
| 2006/0035615 | A1 | 2/2006 | Hoover |
| 2006/0087385 | A1 | 4/2006 | Fitzpatrick et al. |
| 2006/0194550 | A1 | 8/2006 | Block et al. |
| 2007/0022460 | A1 | 1/2007 | Kim et al. |
| 2008/0240000 | A1 | 10/2008 | Kidd |
| 2009/0174622 | A1 | 7/2009 | Kanou |
| 2009/0219908 | A1 | 9/2009 | Rofougaran |
| 2009/0289744 | A1 | 11/2009 | Miyashiro |
| 2010/0102899 | A1 | 4/2010 | Engel |
| 2010/0189031 | A1 | 7/2010 | Kanou |
| 2010/0295630 | A1 | 11/2010 | Itoh et al. |
| 2011/0032854 | A1 | 2/2011 | Carney et al. |
| 2011/0069644 | A1 | 3/2011 | Kim et al. |
| 2011/0110452 | A1 | 5/2011 | Fukamachi et al. |
| 2011/0140803 | A1 | 6/2011 | Kim et al. |
| 2012/0161904 | A1 | 6/2012 | Do et al. |
| 2013/0077540 | A1* | 3/2013 | Black .............. H04B 1/109 370/277 |
| 2013/0083703 | A1 | 4/2013 | Granger-Jones et al. |
| 2013/0090080 | A1 | 4/2013 | Schmidt |
| 2013/0135052 | A1 | 5/2013 | Arkiszewski |
| 2013/0176913 | A1* | 7/2013 | Niskanen .............. H04B 1/48 370/278 |
| 2013/0187825 | A1* | 7/2013 | Andujar Linares .... H01Q 1/243 343/853 |
| 2013/0201880 | A1 | 8/2013 | Bauder et al. |
| 2013/0201881 | A1 | 8/2013 | Bauder et al. |
| 2013/0201882 | A1 | 8/2013 | Bauder et al. |
| 2013/0235806 | A1 | 9/2013 | Nilsson et al. |
| 2013/0244591 | A1* | 9/2013 | Weissman .............. H03H 9/462 455/77 |
| 2013/0244722 | A1 | 9/2013 | Rousu et al. |
| 2014/0003300 | A1 | 1/2014 | Weissman et al. |
| 2014/0185498 | A1 | 7/2014 | Schwent et al. |
| 2014/0192845 | A1 | 7/2014 | Szini et al. |
| 2014/0269853 | A1* | 9/2014 | Gudem .............. H04L 5/0098 375/219 |
| 2014/0321353 | A1* | 10/2014 | Zhan .............. H04W 16/26 370/315 |
| 2014/0323076 | A1 | 10/2014 | Kintis et al. |
| 2015/0016313 | A1 | 1/2015 | Khlat et al. |
| 2015/0017993 | A1* | 1/2015 | Ishii .............. H04W 36/0011 455/444 |
| 2015/0035612 | A1 | 2/2015 | Maxim et al. |
| 2016/0126987 | A1* | 5/2016 | Wloczysiak .......... H03F 1/0205 375/347 |
| 2016/0127029 | A1* | 5/2016 | Wloczysiak ......... H04B 7/0825 375/318 |
| 2017/0310381 | A1* | 10/2017 | Lim .................... H04L 5/14 |

OTHER PUBLICATIONS

Notice of Allowance for U.S. Appl. No. 14/282,393, dated Aug. 19, 2015, 8 pages.
Notice of Allowance for U.S. Appl. No. 14/302,500, dated Oct. 23, 2015, 8 pages.
Vizmuller, Peter, "Chapter 2: Circuit Examples," RF Design Guide: Systems, Circuits, and Equations, Norwood: Artech House, 1995, pp. 95-98.
Young, Leo, et al., "A High Power Diplexing Filter," IRE Transactions on Microwave Theory and Techniques, vol. 7, No. 3, Jul. 1959, pp. 384-387.
Notice of Allowance for U.S. Appl. No. 14/525,092, dated Apr. 11, 2016, 7 pages.
Non-Final Office Action for U.S. Appl. No. 14/498,991, dated May 2, 2016, 14 pages.
Non-Final Office Action for U.S. Appl. No. 14/267,095, dated Jun. 16, 2016, 8 pages.
Non-Final Office Action for U.S. Appl. No. 14/523,065, dated Aug. 2, 2016, 38 pages.
U.S. Appl. No. 14/267,095, filed May 1, 2014.
U.S. Appl. No. 14/282,393, filed May 20, 2014.
U.S. Appl. No. 14/302,500, filed Jun. 12, 2014.
U.S. Appl. No. 14/498,746, filed Sep. 26, 2014.
U.S. Appl. No. 14/659,314, filed Mar. 16, 2015.
U.S. Appl. No. 14/673,192, filed Mar. 30, 2015.
U.S. Appl. No. 14/498,991, filed Sep. 26, 2014.
U.S. Appl. No. 14/523,065, filed Oct. 24, 2014.
U.S. Appl. No. 14/525,092, filed Oct. 27, 2014.
U.S. Appl. No. 14/547,502, filed Nov. 19, 2014.
Non-Final Office Action for U.S. Appl. No. 14/498,746, dated Feb. 24, 2016, 11 pages.
Final Office Action for U.S. Appl. No. 14/498,991, dated Feb. 3, 2016, 14 pages.
Notice of Allowance for U.S. Appl. No. 14/498,746, dated Nov. 15, 2016, 8 pages.
Non-Final Office Action for U.S. Appl. No. 14/547,502, dated Sep. 29, 2016, 46 pages.
Final Office Action for U.S. Appl. No. 14/498,991, dated Sep. 30, 2016, 15 pages.
Frenzel, Lou, "Understanding Solutions for the Crowded Electromagnetic Frequency Spectrum," Electronic Design, Mar. 21, 2012, Penton, 16 pages, http://electronicdesign.com/communications/understanding-solutions-crowded-electromagnetic-frequency-spectrum.
Non-Final Office Action for U.S. Appl. No. 14/267,095, dated Dec. 27, 2016, 10 pages.
Non-Final Office Action for U.S. Appl. No. 14/673,192, dated Dec. 15, 2016, 9 pages.
Advisory Action for U.S. Appl. No. 14/498,991, dated Jan. 3, 2017, 3 pages.
Final Office Action for U.S. Appl. No. 14/523,065, dated Mar. 9, 2017, 34 pages.
Non-Final Office Action for U.S. Appl. No. 14/498,991, dated Mar. 9, 2017, 14 pages.
Non-Final Office Action for U.S. Appl. No. 14/523,065, dated Jul. 24, 2017, 20 pages.
Notice of Allowance for U.S. Appl. No. 14/547,502, dated Sep. 22, 2017, 10 pages.
Notice of Allowance for U.S. Appl. No. 14/498,991, dated Aug. 23, 2017, 9 pages.
Notice of Allowance and Examiner-Initiated Interview Summary for U.S. Appl. No. 14/673,192, dated Sep. 18, 2017, 7 pages.
Final Office Action for U.S. Appl. No. 14/498,746, dated Aug. 5, 2016, 12 pages.
Non-Final Office Action for U.S. Appl. No. 14/659,314, dated Sep. 19, 2016, 15 pages.
Notice of Allowance for U.S. Appl. No. 14/267,095, dated Mar. 29, 2017, 7 pages.
Notice of Allowance for U.S. Appl. No. 14/659,314, dated Apr. 3, 2017, 8 pages.
Non-Final Office Action for U.S. Appl. No. 14/673,192, dated Apr. 14, 2017, 5 pages.

(56) References Cited

OTHER PUBLICATIONS

Final Office Action for U.S. Appl. No. 14/574,502, dated Apr. 20, 2017, 51 pages.
Corrected Notice of Allowability for U.S. Appl. No. 14/547,502, dated Oct. 31, 2017, 6 pages.
Corrected Notice of Allowability for U.S. Appl. No. 14/547,502, dated Jan. 18, 2018, 5 pages.

\* cited by examiner

US 9,935,670 B2

CARRIER AGGREGATION USING MULTIPLE ANTENNAS

RELATED APPLICATIONS

This application claims the benefit of U.S. provisional patent application No. 61/882,671, filed Sep. 26, 2013.

The present application is related to U.S. patent application Ser. No. 14/498,746, filed Sep. 26, 2014, now U.S. Pat. No. 9,608,688, entitled "HIGH LINEARITY RF DIPLEXER," and U.S. patent application Ser. No. 14/498,991, filed Sep. 26, 2014, now U.S. Pat. No. 9,859,943, entitled "TUNABLE RF DIPLEXER."

The present application further relates to co-pending U.S. patent application Ser. No. 14/267,095, entitled "CARRIER AGGREGATION ARRANGEMENTS FOR MOBILE DEVICES," filed on May 1, 2014, now U.S. Pat. No. 9,722,639, which claims priority to U.S. provisional patent applications No. 61/817,912, filed May 1, 2013, No. 61/817,923, filed May 1, 2013, and No. 61/826,659, filed May 23, 2013; U.S. patent application Ser. No. 14/282,393, entitled "TUNABLE FILTER FRONT END ARCHITECTURE FOR NON-CONTIGUOUS CARRIER AGGREGATION," filed on May 20, 2014, now U.S. Pat. No. 9,225,382, which claims priority to U.S. provisional patent application No. 61/825,236, filed May 20, 2013; and U.S. patent application Ser. No. 14/302,500, entitled "CARRIER AGGREGATION ARRANGEMENT USING TRIPLE ANTENNA ARRANGEMENT," filed on Jun. 12, 2014, now U.S. Pat. No. 9,270,302, which claims priority to U.S. provisional patent application No. 61/837,460, filed Jun. 20, 2013.

All of the applications listed above are hereby incorporated herein by reference in their entireties.

FIELD OF THE DISCLOSURE

Embodiments of the present disclosure relate to radio frequency (RF) communications systems, which may include RF front-end circuitry, RF transceiver circuitry, RF transmit circuitry, RF receive circuitry, RF diplexers, RF duplexers, RF filters, RF antennas, RF switches, RF combiners, RF splitters, the like, or any combination thereof.

BACKGROUND

As wireless communications technologies evolve, wireless communications systems become increasingly sophisticated. As such, wireless communications protocols continue to expand and change to take advantage of the technological evolution. As a result, to maximize flexibility, many wireless communications devices must be capable of supporting any number of wireless communications protocols, each of which may have certain performance requirements, such as specific out-of-band emissions requirements, linearity requirements, or the like. Further, portable wireless communications devices are typically battery powered and need to be relatively small, and have low cost. As such, to minimize size, cost, and power consumption, RF circuitry in such a device needs to be as simple, small, flexible, and efficient as is practical. Thus, there is a need for RF circuitry in a communications device that is low cost, small, simple, flexible, and efficient.

SUMMARY

RF front-end circuitry, which includes RF switching and duplexing circuitry, a first RF diplexer, and a second RF diplexer, is disclosed according to one embodiment of the present disclosure. The RF switching and duplexing circuitry operates in one of a group of RF transmit modes, such that the group of RF transmit modes includes at least one transmit uplink carrier aggregation mode. The RF switching and duplexing circuitry provides at least one RF transmit signal based on the one of the group of RF transmit modes. The first RF diplexer is coupled between the RF switching and duplexing circuitry and a primary RF antenna. The second RF diplexer is coupled between the RF switching and duplexing circuitry and an auxiliary RF antenna.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

RF front-end circuitry, which includes RF switching and duplexing circuitry, a first RF diplexer, and a second RF diplexer, is disclosed according to one embodiment of the present disclosure. The RF switching and duplexing circuitry operates in one of a group of RF transmit modes, such that the group of RF transmit modes includes at least one transmit uplink carrier aggregation mode. The RF switching and duplexing circuitry provides at least one RF transmit signal based on the one of the group of RF transmit modes. The first RF diplexer is coupled between the RF switching and duplexing circuitry and a primary RF antenna. The second RF diplexer is coupled between the RF switching and duplexing circuitry and an auxiliary RF antenna.

Figure 1:
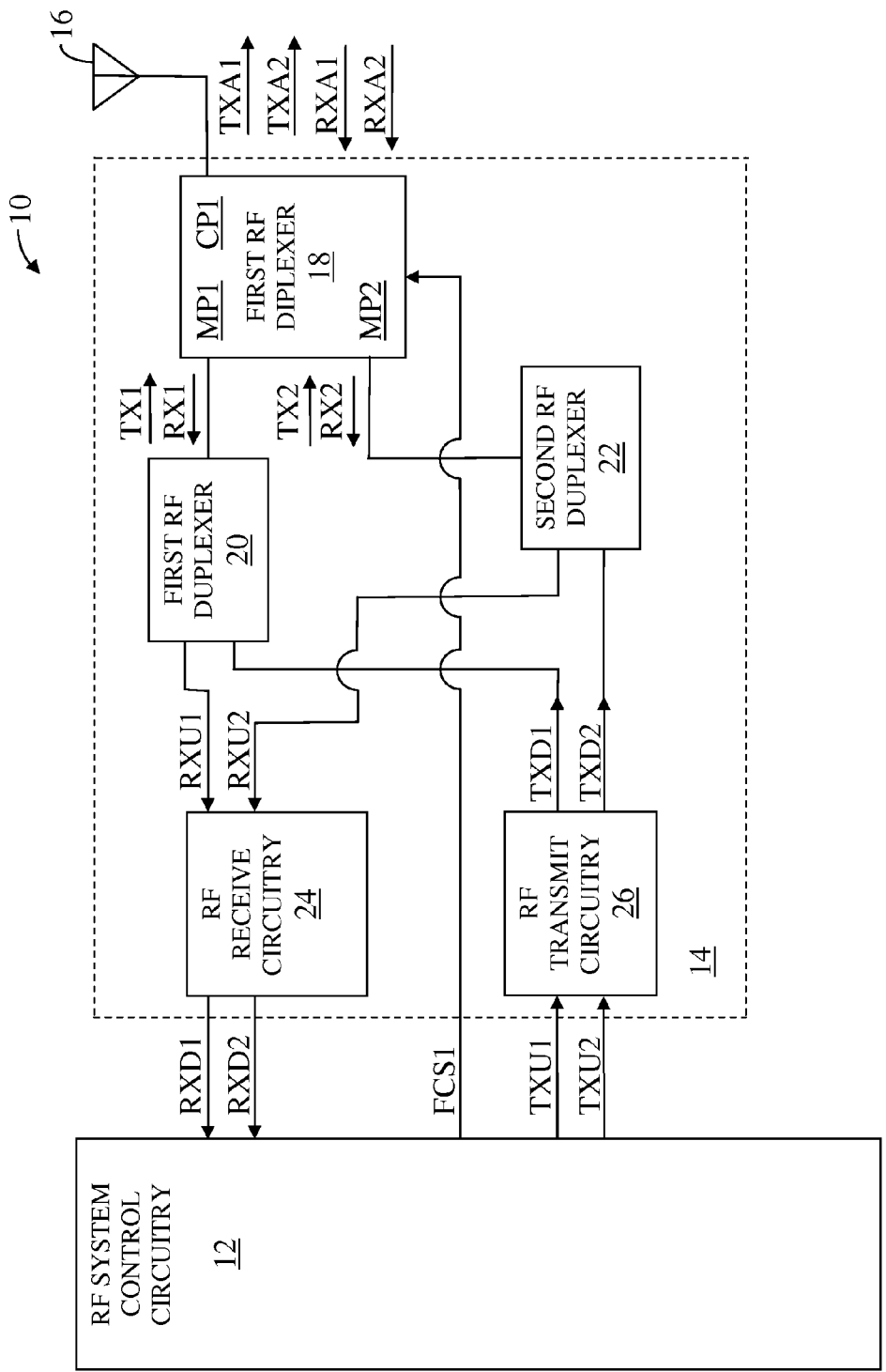
FIG. 1 shows RF communications circuitry according to one embodiment of the RF communications circuitry.

FIG. 1 shows RF communications circuitry 10 according to one embodiment of the RF communications circuitry 10. The RF communications circuitry 10 includes RF system control circuitry 12, RF front-end circuitry 14, and a primary RF antenna 16. The RF front-end circuitry 14 includes a first RF diplexer 18, a first RF duplexer 20, a second RF duplexer 22, RF receive circuitry 24, and RF transmit circuitry 26. The first RF diplexer 18 has a first common port CP1, a first main port MP1, and a second main port MP2. The first common port CP1 is coupled to the primary RF antenna 16.

The first main port MP1 is coupled to the first RF duplexer 20. The second main port MP2 is coupled to the second RF duplexer 22.

In one embodiment of the RF communications circuitry 10, the RF communications circuitry 10 transmits, receives, or both, RF signals to, from, or both, a highband RF communications band, a lowband RF communications band, or both. As such, the RF communications circuitry 10 may communicate simultaneously with both a highband RF communications band and a lowband RF communications band, which are defined as follows. A lowest frequency of the highband RF communications band is greater than all frequencies in the lowband RF communications band. In this regard, highband RF signals fall within the highband RF communications band and lowband RF signals fall within the lowband RF communications band, such that a frequency of a highband RF signal is, by definition, higher than a frequency of a lowband RF signal for a given embodiment of the highband RF communications band and the lowband RF communications band.

In one embodiment of the RF system control circuitry 12, the RF system control circuitry 12 provides a first upstream RF transmit signal TXU1 to the RF transmit circuitry 26, which processes the first upstream RF transmit signal TXU1 to provide a first downstream RF transmit signal TXD1. In one embodiment of the first downstream RF transmit signal TXD1, the first downstream RF transmit signal TXD1 is a highband RF signal.

In an alternate embodiment of the RF system control circuitry 12, the RF system control circuitry 12 provides a second upstream RF transmit signal TXU2 to the RF transmit circuitry 26, which processes the second upstream RF transmit signal TXU2 to provide a second downstream RF transmit signal TXD2. In one embodiment of the second downstream RF transmit signal TXD2, the second downstream RF transmit signal TXD2 is a lowband RF signal.

In an additional embodiment of the RF system control circuitry 12, the RF system control circuitry 12 simultaneously provides the first upstream RF transmit signal TXU1 and the second upstream RF transmit signal TXU2 to the RF transmit circuitry 26, which processes the first upstream RF transmit signal TXU1 and the second upstream RF transmit signal TXU2, respectively, to provide the first downstream RF transmit signal TXD1 and the second downstream RF transmit signal TXD2, respectively. In one embodiment of the first downstream RF transmit signal TXD1 and the second downstream RF transmit signal TXD2, the first downstream RF transmit signal TXD1 is a highband RF signal and the second downstream RF transmit signal TXD2 is a lowband RF signal.

In one embodiment of the RF communications circuitry 10, the RF communications circuitry 10 provides transmit uplink carrier aggregation (TXULCA) by simultaneously providing the first upstream RF transmit signal TXU1 and the second upstream RF transmit signal TXU2 to the RF transmit circuitry 26. The RF transmit circuitry 26 may include up-conversion circuitry, amplification circuitry, power supply circuitry, filtering circuitry, switching circuitry, combining circuitry, splitting circuitry, dividing circuitry, clocking circuitry, the like, or any combination thereof to process the first upstream RF transmit signal TXU1 and the second upstream RF transmit signal TXU2.

In one embodiment of the RF receive circuitry 24, the RF receive circuitry 24 receives and processes a first upstream RF receive signal RXU1 to provide a first downstream RF receive signal RXD1 to the RF system control circuitry 12.

In one embodiment of the first upstream RF receive signal RXU1, the first upstream RF receive signal RXU1 is a highband RF signal.

In an alternate embodiment of the RF receive circuitry 24, the RF receive circuitry 24 receives and processes a second upstream RF receive signal RXU2 to provide a second downstream RF receive signal RXD2 to the RF system control circuitry 12. In one embodiment of the second upstream RF receive signal RXU2, the second upstream RF receive signal RXU2 is a lowband RF signal.

In an additional embodiment of the RF receive circuitry 24, the RF receive circuitry 24 simultaneously receives and processes the first upstream RF receive signal RXU1 and the second upstream RF receive signal RXU2, respectively, to provide the first downstream RF receive signal RXD1 and the second downstream RF receive signal RXD2, respectively. In one embodiment of the first upstream RF receive signal RXU1 and second upstream RF receive signal RXU2, the first upstream RF receive signal RXU1 is a highband RF signal and the second upstream RF receive signal RXU2 is a lowband RF signal.

In one embodiment of the RF receive circuitry 24, the RF receive circuitry 24 supports receive downlink carrier aggregation (RXDLCA) by simultaneously receiving and processing the first upstream RF receive signal RXU1 and the second upstream RF receive signal RXU2. The RF receive circuitry 24 may include down-conversion circuitry, amplification circuitry, low noise amplification circuitry, power supply circuitry, filtering circuitry, switching circuitry, combining circuitry, splitting circuitry, dividing circuitry, clocking circuitry, the like, or any combination thereof.

In one embodiment of the RF front-end circuitry 14, any or all of the first upstream RF transmit signal TXU1, the first downstream RF transmit signal TXD1, the second upstream RF transmit signal TXU2, the second downstream RF transmit signal TXD2, the first upstream RF receive signal RXU1, the first downstream RF receive signal RXD1, the second upstream RF receive signal RXU2, and the second downstream RF receive signal RXD2 are omitted.

An RF duplexer is a well-known RF device in the art having a common port (not shown), a transmit signal port (not shown), and a receive signal port (not shown). Combined RF receive and transmit signals at the common port are separated into an RF receive signal at the receive signal port and an RF transmit signal at the transmit signal port. The RF duplexer is used to at least partially isolate the receive signal port from the RF transmit signal to help receive performance by avoiding receiver de-sensitization of RF receive circuitry by the RF transmit signal. The RF transmit signal and the RF receive signal are separated by a duplex frequency. Additionally, the RF transmit signal and the RF receive signal fall within one respective RF communications band.

The first RF duplexer 20 receives and provides a first RF receive signal RX1 and a first RF transmit signal TX1, respectively. In one embodiment of the first RF duplexer 20, the first RF duplexer 20 receives and provides the first RF receive signal RX1 and the first RF transmit signal TX1 simultaneously. In one embodiment of the first RF duplexer 20, the first RF receive signal RX1 and the first RF transmit signal TX1 are not received and provided simultaneously. In one embodiment of the first RF duplexer 20, the first RF receive signal RX1 is omitted. In one embodiment of the first RF duplexer 20, the first RF transmit signal TX1 is omitted. In one embodiment of the first RF duplexer 20, both the first RF receive signal RX1 and the first RF transmit signal TX1 are omitted. In one embodiment of the RF communications circuitry 10, the first RF duplexer 20 is omitted. In one embodiment of the first RF transmit signal TX1, the first RF transmit signal TX1 is a highband RF transmit signal. In one embodiment of the first RF receive signal RX1, the first RF receive signal RX1 is a highband RF receive signal.

In one embodiment of the first RF duplexer 20, the first RF duplexer 20 receives and forwards the first RF receive signal RX1 to provide the first upstream RF receive signal RXU1. In one embodiment of the first RF duplexer 20, the first RF duplexer 20 receives and forwards the first downstream RF transmit signal TXD1 to provide the first RF transmit signal TX1. In one embodiment of the first RF duplexer 20, the first RF duplexer 20 at least partially isolates the first downstream RF transmit signal TXD1 and the first RF transmit signal TX1 from the RF receive circuitry 24.

The second RF duplexer 22 receives and provides a second RF receive signal RX2 and a second RF transmit signal TX2, respectively. In one embodiment of the second RF duplexer 22, the second RF duplexer 22 receives and provides the second RF receive signal RX2 and the second RF transmit signal TX2 simultaneously. In one embodiment of the second RF duplexer 22, the second RF receive signal RX2 and the second RF transmit signal TX2 are not received and provided simultaneously. In one embodiment of the second RF duplexer 22, the second RF receive signal RX2 is omitted. In one embodiment of the second RF duplexer 22, the second RF transmit signal TX2 is omitted. In one embodiment of the second RF duplexer 22, both the second RF receive signal RX2 and the second RF transmit signal TX2 are omitted. In one embodiment of the RF communications circuitry 10, the second RF duplexer 22 is omitted. In one embodiment of the second RF transmit signal TX2, the second RF transmit signal TX2 is a lowband RF transmit signal. In one embodiment of the second RF receive signal RX2, the second RF receive signal RX2 is a lowband RF receive signal.

In one embodiment of the second RF duplexer 22, the second RF duplexer 22 receives and forwards the second RF receive signal RX2 to provide the second upstream RF receive signal RXU2. In one embodiment of the second RF duplexer 22, the second RF duplexer 22 receives and forwards the second downstream RF transmit signal TXD2 to provide the second RF transmit signal TX2. In one embodiment of the second RF duplexer 22, the second RF duplexer 22 at least partially isolates the second downstream RF transmit signal TXD2 and the second RF transmit signal TX2 from the RF receive circuitry 24.

As previously mentioned, the first RF diplexer 18 has the first common port CP1, the first main port MP1, and the second main port MP2. The first common port CP1 is coupled to the primary RF antenna 16. The first main port MP1 is coupled to the first RF duplexer 20. The second main port MP2 is coupled to the second RF duplexer 22. In general, in one embodiment of the first RF diplexer 18, the first RF diplexer 18 separates combined RF signals at the first common port CP1 into separate RF signals at each of the first main port MP1 and the second main port MP2. In one embodiment of the first RF diplexer 18, RF signals at the first main port MP1 are associated with one RF communications band, and RF signals at the second main port MP2 are associated with another RF communications band. Therefore, RF signals at the first common port CP1 may be associated with both RF communications bands.

By segregating the RF signals in this manner, processing of the RF signals may be simplified, may enhance RF performance, or both. As such, in one embodiment of the first RF diplexer 18, signals at the first main port MP1 are associated with a highband RF communications band and signals at the second main port MP2 are associated with a lowband RF communications band. Therefore, signals at the first common port CP1 may be associated with the highband RF communications band, the lowband RF communications band, or both.

In one embodiment of the first RF diplexer 18, the first main port MP1 is substantially isolated from the second main port MP2. In an exemplary embodiment of the first RF diplexer 18, highband RF signals at the first main port MP1 are isolated from the second main port MP2 by at least 37 decibels (dB). Conversely, in an exemplary embodiment of the first RF diplexer 18, lowband RF signals at the second main port MP2 are isolated from the first main port MP1 by at least 37 dB.

The first RF diplexer 18 receives and forwards the first RF transmit signal TX1 via the first main port MP1 to the first common port CP1 to provide a first RF antenna transmit signal TXA1. In one embodiment of the first RF transmit signal TX1, the first RF transmit signal TX1 is a highband RF transmit signal. In one embodiment of the first RF antenna transmit signal TXA1, the first RF antenna transmit signal TXA1 is a highband RF antenna transmit signal.

The first RF diplexer 18 receives and forwards the second RF transmit signal TX2 via the second main port MP2 to the first common port CP1 to provide a second RF antenna transmit signal TXA2. In one embodiment of the second RF transmit signal TX2, the second RF transmit signal TX2 is a lowband RF transmit signal. In one embodiment of the second RF antenna transmit signal TXA2, the second RF antenna transmit signal TXA2 is a lowband RF antenna transmit signal.

In one embodiment of the first RF diplexer 18, the first RF diplexer 18 establishes TXULCA by providing the lowband RF transmit signal and the highband RF transmit signal simultaneously. As such, the lowband RF antenna transmit signal and the highband RF antenna transmit signal are TXULCA signals. In one embodiment of the first RF diplexer 18, the highband RF antenna transmit signal is substantially isolated from the second main port MP2 and the lowband RF antenna transmit signal is substantially isolated from the first main port MP1. In an exemplary embodiment of the first RF diplexer 18, the highband RF antenna transmit signal is isolated from the second main port MP2 by at least 37 dB, and the lowband RF antenna transmit signal is isolated from the first main port MP1 by at least 37 dB.

The first RF diplexer 18 receives and forwards a first RF antenna receive signal RXA1 via the primary RF antenna 16 to the first main port MP1 to provide the first RF receive signal RX1. In one embodiment of the first RF antenna receive signal RXA1, the first RF antenna receive signal RXA1 is a highband RF antenna receive signal. In one embodiment of the first RF receive signal RX1, the first RF receive signal RX1 is a highband RF receive signal.

The first RF diplexer 18 receives and forwards a second RF antenna receive signal RXA2 via the primary RF antenna 16 to the second main port MP2 to provide the second RF receive signal RX2. In one embodiment of the second RF antenna receive signal RXA2, the second RF antenna receive signal RXA2 is a lowband RF antenna receive signal. In one embodiment of the second RF receive signal RX2, the second RF receive signal RX2 is a lowband RF receive signal.

In one embodiment of the first RF diplexer 18, the first RF diplexer 18 establishes RXDLCA by receiving the highband RF antenna receive signal and the lowband RF antenna receive signal simultaneously. As such, the highband RF antenna receive signal and the lowband RF antenna receive signal are RXDLCA signals.

In one embodiment of the RF front-end circuitry 14, any or all of the first RF transmit signal TX1, the second RF transmit signal TX2, the first RF antenna transmit signal TXA1, the second RF antenna transmit signal TXA2, the first RF receive signal RX1, the second RF receive signal RX2, the first RF antenna receive signal RXA1, and the second RF antenna receive signal RXA2 are omitted.

In one embodiment of the RF system control circuitry 12 and the first RF diplexer 18, the RF system control circuitry 12 provides a first function configuration signal FCS1 to the first RF diplexer 18. As such, the RF system control circuitry 12 may configure, tune, adjust, enable, disable, vary, or any combination thereof, circuits within the first RF diplexer 18 as necessary using the first function configuration signal FCS1.

Figure 2:
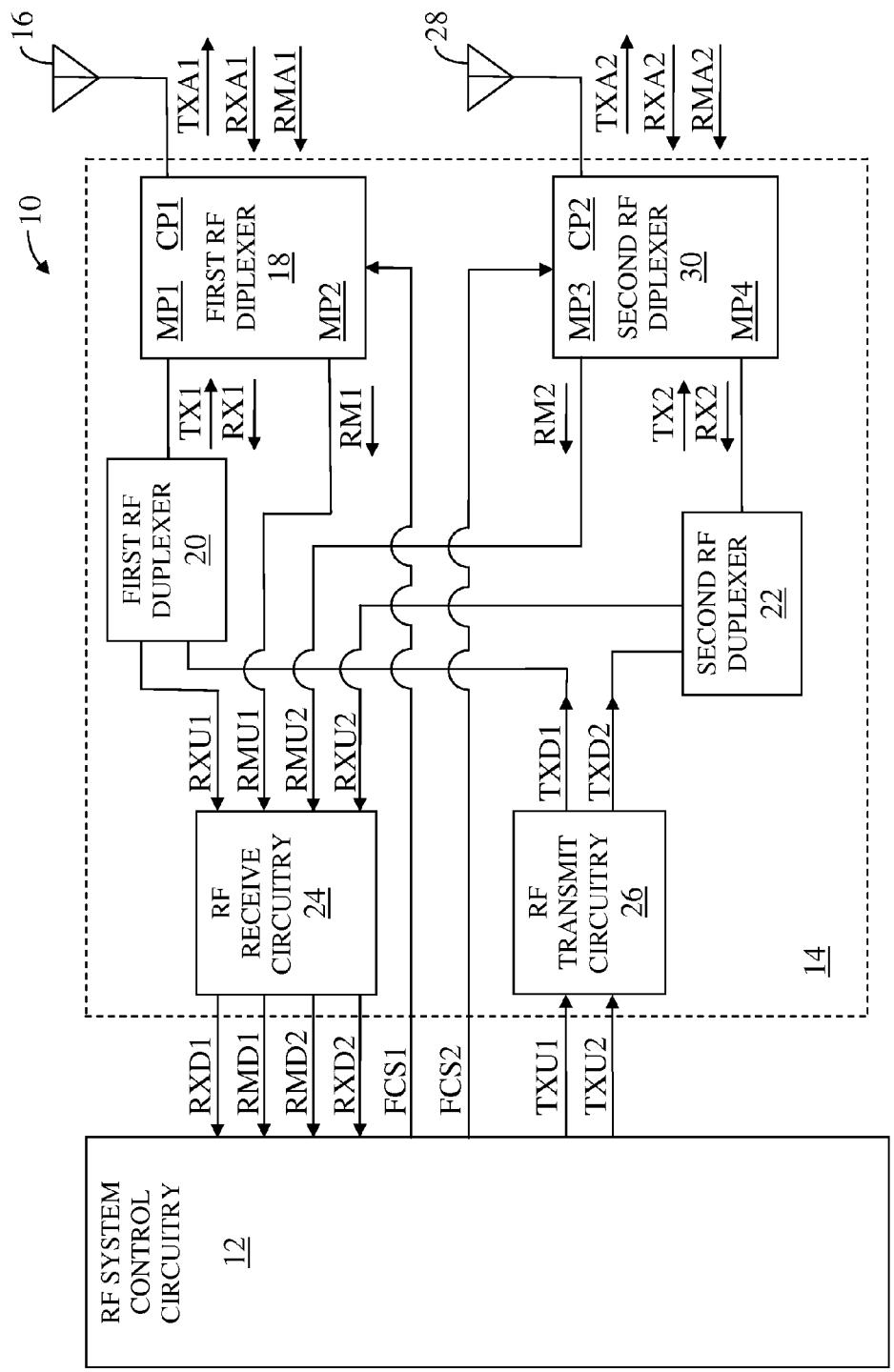
FIG. 2 shows RF communications circuitry according to an alternate embodiment of the RF communications circuitry.

FIG. 2 shows RF communications circuitry 10 according to an alternate embodiment of the RF communications circuitry 10. The RF communications circuitry 10 illustrated in FIG. 2 is similar to the RF communications circuitry 10 illustrated in FIG. 1, except the RF communications circuitry 10 illustrated in FIG. 2 further includes an auxiliary RF antenna 28 and the RF front-end circuitry 14 illustrated in FIG. 2 further includes a second RF diplexer 30.

The second RF diplexer 30 has a second common port CP2, a third main port MP3, and a fourth main port MP4. In one embodiment of the second RF diplexer 30, the second RF diplexer 30 functions similarly to the first RF diplexer 18. As such, the second common port CP2 functions similarly to the first common port CP1. The third main port MP3 functions similarly to the first main port MP1. The fourth main port MP4 functions similarly to the second main port MP2. Therefore, in one embodiment of the second RF diplexer 30, RF signals at the third main port MP3 are associated with one RF communications band, and RF signals at the fourth main port MP4 are associated with another RF communications band. Therefore, RF signals at the second common port CP2 may be associated with both RF communications bands.

In this regard, in one embodiment of the second RF diplexer 30, signals at the third main port MP3 are associated with the highband RF communications band and signals at the fourth main port MP4 are associated with the lowband RF communications band. Therefore, signals at the second common port CP2 may be associated with the highband RF communications band, the lowband RF communications band, or both.

The auxiliary RF antenna 28 is coupled to the second common port CP2. The second RF duplexer 22 is coupled to the fourth main port MP4 instead of being coupled to the second main port MP2. As such, the second RF transmit signal TX2 and the second RF receive signal RX2 are associated with the fourth main port MP4 instead of being associated with the second main port MP2. As a result, the second RF antenna transmit signal TXA2 and the second RF antenna receive signal RXA2 are associated with the auxiliary RF antenna 28 instead of being associated with the primary RF antenna 16. By moving the second RF antenna transmit signal TXA2 and the second RF antenna receive signal RXA2 to the auxiliary RF antenna 28, the isolation requirements between the first main port MP1 and the fourth main port MP4 may be relaxed due to isolation between the primary RF antenna 16 and the auxiliary RF antenna 28.

For example, in one embodiment of the RF communications circuitry 10 illustrated in FIG. 1, the first RF diplexer 18 provided at least 37 dB of isolation between the first RF transmit signal TX1 and the second RF receive signal RX2, and further provided at least 37 dB of isolation between the second RF transmit signal TX2 and the first RF receive signal RX1. However, with the second RF transmit signal TX2 and the second RF receive signal RX2 being associated with the fourth main port MP4 instead of being associated with the second main port MP2, if there is 10 dB of isolation between the primary RF antenna 16 and the auxiliary RF antenna 28, the isolation requirement between the first main port MP1 and the second main port MP2 is relaxed to 27 dB, and the isolation requirement between the third main port MP3 and the fourth main port MP4 is also relaxed to 27 dB.

Receive multiple-input multiple-output (MIMO) is a technique that uses multiple RF antennas to simultaneously receive RF receive signals in the same RF communications band. By receiving that same information using multiple receive signals, overall RF receive performance may be increased.

As such, in one embodiment of the first RF diplexer 18, the first RF diplexer 18 receives and forwards a first RF MIMO antenna receive signal RMA1 via the primary RF antenna 16 to the second main port MP2 to provide a first RF MIMO receive signal RM1, which is a first upstream RF MIMO receive signal RMU1. The RF receive circuitry 24 receives and processes the first upstream RF MIMO receive signal RMU1 to provide a first downstream RF MIMO receive signal RMD1 to the RF system control circuitry 12. Additionally, the second RF diplexer 30 receives and forwards a second RF MIMO antenna receive signal RMA2 via the auxiliary RF antenna 28 to the third main port MP3 to provide a second RF MIMO receive signal RM2, which is a second upstream RF MIMO receive signal RMU2. The RF receive circuitry 24 receives and processes the second upstream RF MIMO receive signal RMU2 to provide a second downstream RF MIMO receive signal RMD2 to the RF system control circuitry 12.

In one embodiment of the first RF MIMO antenna receive signal RMA1 and the first RF MIMO receive signal RM1, the first RF MIMO antenna receive signal RMA1 is a lowband RF MIMO antenna receive signal and the first RF MIMO receive signal RM1 is a lowband RF MIMO receive signal. In one embodiment of the second RF MIMO antenna receive signal RMA2 and the second RF MIMO receive signal RM2, the second RF MIMO antenna receive signal RMA2 is a highband RF MIMO antenna receive signal and the second RF MIMO receive signal RM2 is a highband RF MIMO receive signal.

In one embodiment of the RF system control circuitry 12 and the second RF diplexer 30, the RF system control circuitry 12 provides a second function configuration signal FCS2 to the second RF diplexer 30. As such, the RF system control circuitry 12 may configure, tune, adjust, enable, disable, vary, or any combination thereof, circuits (not shown) within the second RF diplexer 30 as necessary using the second function configuration signal FCS2.

Figure 3:
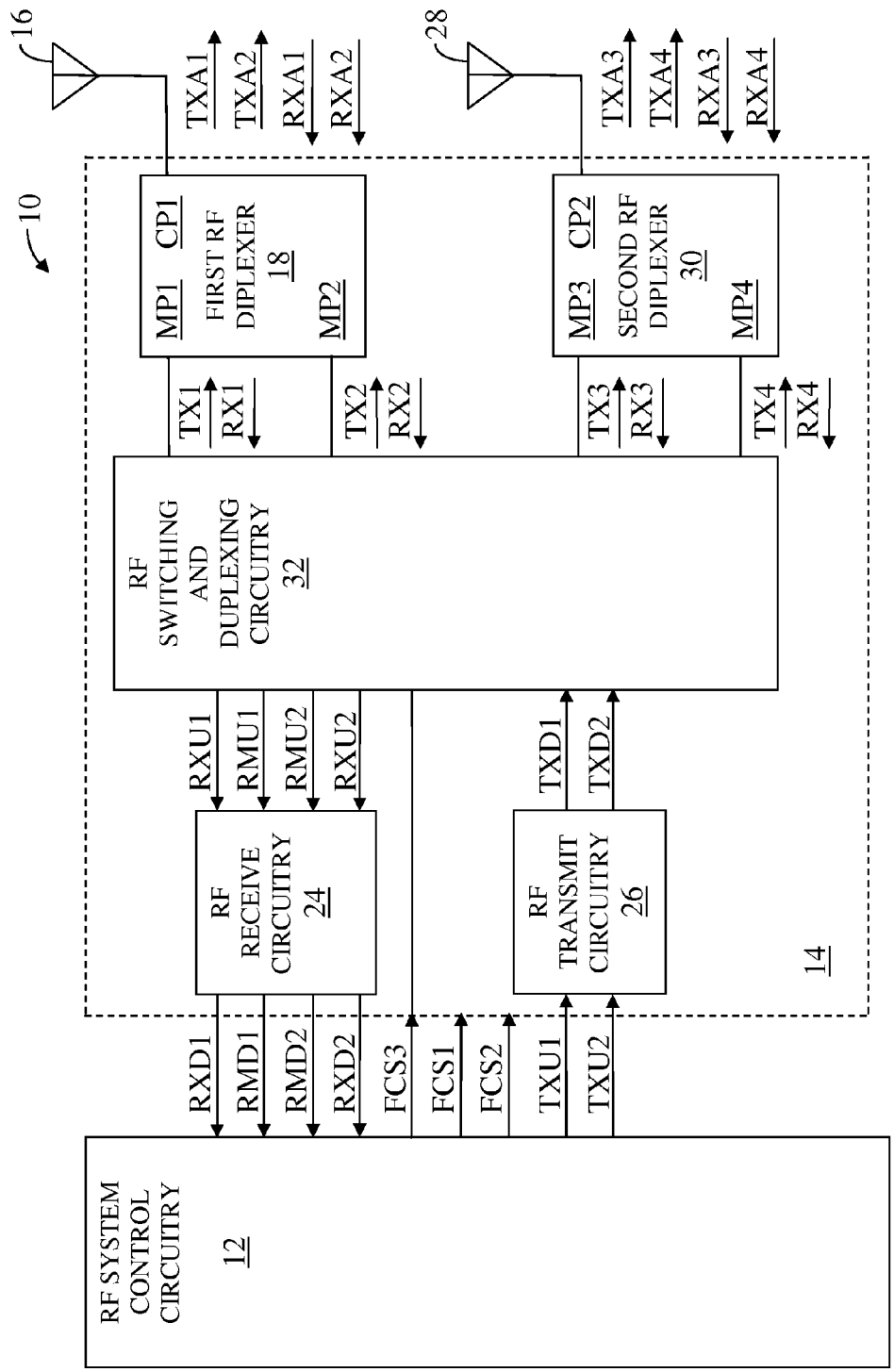
FIG. 3 shows RF communications circuitry according to an additional embodiment of the RF communications circuitry.

FIG. 3 shows RF communications circuitry 10 according to an additional embodiment of the RF communications circuitry 10. The RF communications circuitry 10 illustrated in FIG. 3 is similar to the RF communications circuitry 10 illustrated in FIG. 2, except in the RF communications circuitry 10 illustrated in FIG. 3, the first RF duplexer 20 and the second RF duplexer 22 are omitted, and the RF front-end circuitry 14 further includes RF switching and duplexing circuitry 32. The RF switching and duplexing circuitry 32 is coupled between the RF receive circuitry 24 and the first RF diplexer 18, between the RF receive circuitry 24 and the second RF diplexer 30, between the RF transmit circuitry 26 and the first RF diplexer 18, and between the RF transmit circuitry 26 and the second RF diplexer 30.

The RF switching and duplexing circuitry 32 includes multiple RF duplexers (not shown) and multiple RF switches (not shown). As such, the RF switching and duplexing circuitry 32 is used to receive, filter, and forward RF signals TXD1, TXD2 from the RF transmit circuitry 26 to the first RF diplexer 18, to the second RF diplexer 30, or both. Additionally, the RF switching and duplexing circuitry 32 is used to receive, filter, and forward RF signals from the first RF diplexer 18, from the second RF diplexer 30, or both to provide RF signals RXU1, RXU2, RMU1, RMU2 to the RF receive circuitry 24.

In one embodiment of the RF system control circuitry 12 and the RF switching and duplexing circuitry 32, the RF system control circuitry 12 provides a third function configuration signal FCS3 to the RF switching and duplexing circuitry 32, such that signal routing within the RF switching and duplexing circuitry 32, duplexer selection within the RF switching and duplexing circuitry 32, duplexer tuning within the RF switching and duplexing circuitry 32, or any combination thereof are based on the third function configuration signal FCS3.

If the RF switching and duplexing circuitry 32 is configured to provide the first RF transmit signal TX1, the first RF diplexer 18 receives and forwards the first RF transmit signal TX1 via the first main port MP1 to the first common port CP1 to provide the first RF antenna transmit signal TXA1. In one embodiment of the first RF transmit signal TX1, the first RF transmit signal TX1 is the highband RF transmit signal. In one embodiment of the first RF antenna transmit signal TXA1, the first RF antenna transmit signal TXA1 is the highband RF antenna transmit signal.

If the RF switching and duplexing circuitry 32 is configured to provide the second RF transmit signal TX2, the first RF diplexer 18 receives and forwards the second RF transmit signal TX2 via the second main port MP2 to the first common port CP1 to provide the second RF antenna transmit signal TXA2. In one embodiment of the second RF transmit signal TX2, the second RF transmit signal TX2 is the lowband RF transmit signal. In one embodiment of the second RF antenna transmit signal TXA2, the second RF antenna transmit signal TXA2 is the lowband RF antenna transmit signal.

If the RF switching and duplexing circuitry 32 is configured to receive the first RF receive signal RX1, the first RF diplexer 18 receives and forwards the first RF antenna receive signal RXA1 via the primary RF antenna 16 to the first main port MP1 to provide the first RF receive signal RX1. In one embodiment of the first RF antenna receive signal RXA1, the first RF antenna receive signal RXA1 is the highband RF antenna receive signal. In one embodiment of the first RF receive signal RX1, the first RF receive signal RX1 is the highband RF receive signal. In an alternate embodiment of the first RF antenna receive signal RXA1, the first RF antenna receive signal RXA1 is the highband RF MIMO antenna receive signal. In an alternate embodiment of the first RF receive signal RX1, the first RF receive signal RX1 is the highband RF MIMO receive signal.

If the RF switching and duplexing circuitry 32 is configured to receive the second RF receive signal RX2, the first RF diplexer 18 receives and forwards the second RF antenna receive signal RXA2 via the primary RF antenna 16 to the second main port MP2 to provide the second RF receive signal RX2. In one embodiment of the second RF antenna receive signal RXA2, the second RF antenna receive signal RXA2 is the lowband RF antenna receive signal. In one embodiment of the second RF receive signal RX2, the second RF receive signal RX2 is the lowband RF receive signal. In an alternate embodiment of the second RF antenna receive signal RXA2, the second RF antenna receive signal RXA2 is the lowband RF MIMO antenna receive signal. In an alternate embodiment of the second RF receive signal RX2, the second RF receive signal RX2 is the lowband RF MIMO receive signal.

If the RF switching and duplexing circuitry 32 is configured to provide a third RF transmit signal TX3, the second RF diplexer 30 receives and forwards the third RF transmit signal TX3 via the third main port MP3 to the second common port CP2 to provide a third RF antenna transmit signal TXA3. In one embodiment of the third RF transmit signal TX3, the third RF transmit signal TX3 is the highband RF transmit signal. In one embodiment of the third RF antenna transmit signal TXA3, the third RF antenna transmit signal TXA3 is the highband RF antenna transmit signal.

If the RF switching and duplexing circuitry 32 is configured to provide a fourth RF transmit signal TX4, the second RF diplexer 30 receives and forwards the fourth RF transmit signal TX4 via the fourth main port MP4 to the second common port CP2 to provide a fourth RF antenna transmit signal TXA4. In one embodiment of the fourth RF transmit signal TX4, the fourth RF transmit signal TX4 is the lowband RF transmit signal. In one embodiment of the fourth RF antenna transmit signal TXA4, the fourth RF antenna transmit signal TXA4 is the lowband RF antenna transmit signal.

If the RF switching and duplexing circuitry 32 is configured to receive a third RF receive signal RX3, the second RF diplexer 30 receives and forwards a third RF antenna receive signal RXA3 via the auxiliary RF antenna 28 to the third main port MP3 to provide a third RF receive signal RX3. In one embodiment of the third RF antenna receive signal RXA3, the third RF antenna receive signal RXA3 is the highband RF antenna receive signal. In one embodiment of the third RF receive signal RX3, the third RF receive signal RX3 is the highband RF receive signal. In an alternate embodiment of the third RF antenna receive signal RXA3, the third RF antenna receive signal RXA3 is the highband RF MIMO antenna receive signal. In an alternate embodiment of the third RF receive signal RX3, the third RF receive signal RX3 is the highband RF MIMO receive signal.

If the RF switching and duplexing circuitry 32 is configured to receive the fourth RF receive signal RX4, the second RF diplexer 30 receives and forwards the fourth RF antenna receive signal RXA4 via the auxiliary RF antenna 28 to the fourth main port MP4 to provide the fourth RF receive signal RX4. In one embodiment of the fourth RF antenna receive signal RXA4, the fourth RF antenna receive signal RXA4 is the lowband RF antenna receive signal. In one embodiment of the fourth RF receive signal RX4, the fourth RF receive signal RX4 is the lowband RF receive signal. In an alternate embodiment of the fourth RF antenna receive signal RXA4, the fourth RF antenna receive signal RXA4 is the lowband RF MIMO antenna receive signal. In an alternate embodiment of the fourth RF receive signal RX4, the fourth RF receive signal RX4 is the lowband RF MIMO receive signal.

The first RF diplexer 18 is coupled between the RF switching and duplexing circuitry 32 and the primary RF antenna 16. The second RF diplexer 30 is coupled between the RF switching and duplexing circuitry 32 and the auxiliary RF antenna 28. The RF system control circuitry 12 selects one of a group of RF transmit modes. As such, the RF switching and duplexing circuitry 32 operates in the selected one of the group of RF transmit modes. In one embodiment of the group of RF transmit modes, the group of RF transmit modes includes at least one transmit uplink carrier aggregation mode. The RF switching and duplexing circuitry 32 provides at least one RF transmit signal based on the selected one of the group of RF transmit modes. The RF system control circuitry 12 provides the first function configuration signal FCS1, the second function configuration signal FCS2, and the third function configuration signal FCS3 based on the selected one of the group of RF transmit modes.

In one embodiment of the RF system control circuitry 12, the RF system control circuitry 12 selects one of a group of RF receive modes. As such, the RF switching and duplexing circuitry 32 operates in the selected one of the group of RF receive modes. In one embodiment of the RF system control circuitry 12, the RF system control circuitry 12 simultaneously selects the one of the group of RF receive modes and the one of the group of RF transmit modes. As such, the RF switching and duplexing circuitry 32 simultaneously operates in the selected one of the group of RF receive modes and the selected one of the group of RF transmit modes.

In one embodiment of the group of RF transmit modes, the one transmit uplink carrier aggregation mode is a single antenna first RF diplexer transmit mode, such that during the single antenna first RF diplexer transmit mode, the RF switching and duplexing circuitry 32 provides a highband RF antenna transmit signal to the primary RF antenna 16 via the first RF diplexer 18 and further provides a lowband RF antenna transmit signal to the primary RF antenna 16 via the first RF diplexer 18.

In an alternate embodiment of the group of RF transmit modes, the one transmit uplink carrier aggregation mode is a single antenna second RF diplexer transmit mode, such that during the single antenna second RF diplexer transmit mode, the RF switching and duplexing circuitry 32 provides a highband RF antenna transmit signal to the auxiliary RF antenna 28 via the second RF diplexer 30 and further provides a lowband RF antenna transmit signal to the auxiliary RF antenna 28 via the second RF diplexer 30.

In an additional embodiment of the group of RF transmit modes, the one transmit uplink carrier aggregation mode is a dual antenna first RF diplexer transmit mode, such that during the dual antenna first RF diplexer transmit mode, the RF switching and duplexing circuitry 32 provides a highband RF antenna transmit signal to the primary RF antenna 16 via the first RF diplexer 18 and further provides a lowband RF antenna transmit signal to the auxiliary RF antenna 28 via the second RF diplexer 30.

In another embodiment of the group of RF transmit modes, the one transmit uplink carrier aggregation mode is a dual antenna second RF diplexer transmit mode, such that during the dual antenna second RF diplexer transmit mode, the RF switching and duplexing circuitry 32 provides a lowband RF antenna transmit signal to the primary RF antenna 16 via the first RF diplexer 18 and further provides a highband RF antenna transmit signal to the auxiliary RF antenna 28 via the second RF diplexer 30.

In one embodiment of the group of RF transmit modes, the group of RF transmit modes further includes a single highband transmit signal, first RF diplexer transmit mode, such that during the single highband transmit signal, first RF diplexer transmit mode, the RF switching and duplexing circuitry 32 provides a highband RF antenna transmit signal to the primary RF antenna 16 via the first RF diplexer 18.

In an alternate embodiment of the group of RF transmit modes, the group of RF transmit modes further includes a single lowband transmit signal, first RF diplexer transmit mode, such that during the single lowband transmit signal, first RF diplexer transmit mode, the RF switching and duplexing circuitry 32 provides a lowband RF antenna transmit signal to the primary RF antenna 16 via the first RF diplexer 18.

In an additional embodiment of the group of RF transmit modes, the group of RF transmit modes further includes a single highband transmit signal, second RF diplexer transmit mode, such that during the single highband transmit signal, second RF diplexer transmit mode, the RF switching and duplexing circuitry 32 provides a highband RF antenna transmit signal to the auxiliary RF antenna 28 via the second RF diplexer 30.

In another embodiment of the group of RF transmit modes, the group of RF transmit modes further includes a single lowband transmit signal, second RF diplexer transmit mode, such that during the single lowband transmit signal, second RF diplexer transmit mode, the RF switching and duplexing circuitry 32 provides a lowband RF antenna transmit signal to the auxiliary RF antenna 28 via the second RF diplexer 30.

In one embodiment of the group of RF receive modes, the group of RF receive modes includes a group of receive downlink carrier aggregation modes. In one embodiment of the group of receive downlink carrier aggregation modes, the group of receive downlink carrier aggregation modes includes a single antenna first RF diplexer receive mode, such that during the single antenna first RF diplexer receive mode, the RF switching and duplexing circuitry 32 receives a highband RF antenna receive signal from the primary RF antenna 16 via the first RF diplexer 18 and further receives a lowband RF antenna transmit signal from the primary RF antenna 16 via the first RF diplexer 18.

In an alternate embodiment of the group of receive downlink carrier aggregation modes, the group of receive downlink carrier aggregation modes includes a single antenna second RF diplexer receive mode, such that during the single antenna second RF diplexer receive mode, the RF switching and duplexing circuitry 32 receives a highband RF antenna receive signal from the auxiliary RF antenna 28 via the second RF diplexer 30 and further receives a lowband RF antenna transmit signal from the auxiliary RF antenna 28 via the second RF diplexer 30.

In an additional embodiment of the group of receive downlink carrier aggregation modes, the group of receive downlink carrier aggregation modes includes a dual antenna first RF diplexer receive mode, such that during the dual antenna first RF diplexer receive mode, the RF switching and duplexing circuitry 32 receives a highband RF antenna receive signal from the primary RF antenna 16 via the first RF diplexer 18 and further receives a lowband RF antenna receive signal from the auxiliary RF antenna 28 via the second RF diplexer 30.

In another embodiment of the group of receive downlink carrier aggregation modes, the group of receive downlink carrier aggregation modes includes a dual antenna second RF diplexer receive mode, such that during the dual antenna second RF diplexer receive mode, the RF switching and duplexing circuitry 32 receives a lowband RF antenna receive signal from the primary RF antenna 16 via the first RF diplexer 18 and further receives a highband RF antenna receive signal from the auxiliary RF antenna 28 via the second RF diplexer 30.

In one embodiment of the group of RF receive modes, the group of RF receive modes includes a highband receive signal, lowband MIMO receive signal mode, such that during the highband receive signal, lowband MIMO receive signal mode, the RF switching and duplexing circuitry 32 receives a highband RF antenna receive signal and further receives a lowband RF MIMO antenna receive signal.

In one embodiment of the group of RF receive modes, the group of RF receive modes includes a lowband receive signal, highband MIMO receive signal mode, such that during the lowband receive signal, highband MIMO receive signal mode, the RF switching and duplexing circuitry 32 receives a lowband RF antenna receive signal and further receives a highband RF MIMO antenna receive signal.

Those skilled in the art will recognize improvements and modifications to the embodiments of the present disclosure. All such improvements and modifications are considered within the scope of the concepts disclosed herein and the claims that follow.

What is claimed is:

1. An apparatus comprising:
Radio frequency (RF) switching and duplexing circuitry configured to:
operate in one of a plurality of RF transmit modes, such that the plurality of RF transmit modes comprises at least one transmit uplink carrier aggregation mode;
during the at least one transmit uplink carrier aggregation mode, provide transmit uplink carrier aggregation by simultaneously providing at least two RF transmit signals comprising a highband RF antenna transmit signal and a lowband RF antenna transmit signal, wherein a frequency of the highband RF antenna transmit signal is higher than a frequency of the lowband RF antenna transmit signal;
operate in one of a plurality of RF receive modes, wherein the plurality of RF receive modes comprises a plurality of receive downlink carrier aggregation modes, wherein the plurality of receive downlink carrier aggregation modes comprises a dual antenna first RF diplexer receive mode, such that during the dual antenna first RF diplexer receive mode, the RF switching and duplexing circuitry is further configured to:
receive a highband RF antenna receive signal from the primary RF antenna via the first RF diplexer; and
receive a lowband RF antenna receive signal from the auxiliary RF antenna via the second RF diplexer;
a first RF diplexer coupled between the RF switching and duplexing circuitry and a primary RF antenna; and
a second RF diplexer coupled between the RF switching and duplexing circuitry and an auxiliary RF antenna, wherein RF front-end circuitry comprises the RF switching and duplexing circuitry, the first RF diplexer, and the second RF diplexer.

2. The apparatus of claim 1 comprising control circuitry configured to select the one of the plurality of RF transmit modes.

3. The apparatus of claim 1 wherein the one transmit uplink carrier aggregation mode is a single antenna first RF diplexer transmit mode, such that during the single antenna first RF diplexer transmit mode, the RF switching and duplexing circuitry is further configured to:
provide the highband RF antenna transmit signal to the primary RF antenna via the first RF diplexer; and
provide the lowband RF antenna transmit signal to the primary RF antenna via the first RF diplexer.

4. The apparatus of claim 1 wherein the one transmit uplink carrier aggregation mode is a single antenna second RF diplexer transmit mode, such that during the single antenna second RF diplexer transmit mode, the RF switching and duplexing circuitry is further configured to:
provide the highband RF antenna transmit signal to the auxiliary RF antenna via the second RF diplexer; and
provide the lowband RF antenna transmit signal to the auxiliary RF antenna via the second RF diplexer.

5. The apparatus of claim 1 wherein the one transmit uplink carrier aggregation mode is a dual antenna first RF diplexer transmit mode, such that during the dual antenna first RF diplexer transmit mode, the RF switching and duplexing circuitry is further configured to:
provide the highband RF antenna transmit signal to the primary RF antenna via the first RF diplexer; and
provide the lowband RF antenna transmit signal to the auxiliary RF antenna via the second RF diplexer.

6. The apparatus of claim 1 wherein the one transmit uplink carrier aggregation mode is a dual antenna second RF diplexer transmit mode, such that during the dual antenna second RF diplexer transmit mode, the RF switching and duplexing circuitry is further configured to:
provide the lowband RF antenna transmit signal to the primary RF antenna via the first RF diplexer; and
provide the highband RF antenna transmit signal to the auxiliary RF antenna via the second RF diplexer.

7. The apparatus of claim 1 wherein the plurality of RF transmit modes further comprises a single highband transmit signal, first RF diplexer transmit mode, such that during the single highband transmit signal, first RF diplexer transmit mode, the RF switching and duplexing circuitry is further configured to provide the highband RF antenna transmit signal to the primary RF antenna via the first RF diplexer.

8. The apparatus of claim 1 wherein the plurality of RF transmit modes further comprises a single lowband transmit signal, first RF diplexer transmit mode, such that during the single lowband transmit signal, first RF diplexer transmit mode, the RF switching and duplexing circuitry is further configured to provide the lowband RF antenna transmit signal to the primary RF antenna via the first RF diplexer.

9. The apparatus of claim 1 wherein the plurality of RF transmit modes further comprises a single highband transmit signal, second RF diplexer transmit mode, such that during the single highband transmit signal, second RF diplexer transmit mode, the RF switching and duplexing circuitry is further configured to provide the highband RF antenna transmit signal to the auxiliary RF antenna via the second RF diplexer.

10. The apparatus of claim 1 wherein the RF switching and duplexing circuitry is further configured to simultaneously operate in the one of a plurality of RF receive modes and the one of the plurality of RF transmit modes.

11. The apparatus of claim 1 wherein the plurality of receive downlink carrier aggregation modes comprises a single antenna first RF diplexer receive mode, such that during the single antenna first RF diplexer receive mode, the RF switching and duplexing circuitry is further configured to:
receive a highband RF antenna receive signal from the primary RF antenna via the first RF diplexer; and
receive a lowband RF antenna transmit signal from the primary RF antenna via the first RF diplexer.

12. The apparatus of claim 1 wherein the plurality of receive downlink carrier aggregation modes comprises a single antenna second RF diplexer receive mode, such that during the single antenna second RF diplexer receive mode, the RF switching and duplexing circuitry is further configured to:
  receive a highband RF antenna receive signal from the auxiliary RF antenna via the second RF diplexer; and
  receive a lowband RF antenna transmit signal from the auxiliary RF antenna via the second RF diplexer.

13. The apparatus of claim 1 wherein the plurality of receive downlink carrier aggregation modes comprises a dual antenna second RF diplexer receive mode, such that during the dual antenna second RF diplexer receive mode, the RF switching and duplexing circuitry is further configured to:
  receive a lowband RF antenna receive signal from the primary RF antenna via the first RF diplexer; and
  receive a highband RF antenna receive signal from the auxiliary RF antenna via the second RF diplexer.

14. The apparatus of claim 1 wherein the plurality of RF receive modes further comprises a highband receive signal, lowband MIMO receive signal mode, such that during the highband receive signal, lowband MIMO receive signal mode, the RF switching and duplexing circuitry is further configured to receive a highband RF antenna receive signal and further receive a lowband RF MIMO antenna receive signal.

15. The apparatus of claim 1 wherein the plurality of RF receive modes further comprises a lowband receive signal, highband MIMO receive signal mode, such that during the lowband receive signal, highband MIMO receive signal mode, the RF switching and duplexing circuitry is further configured to receive a lowband RF antenna receive signal and further receive a highband RF MIMO antenna receive signal.

16. An apparatus comprising:
  Radio frequency (RF) switching and duplexing circuitry configured to:
  operate in one of a plurality of RF transmit modes, such that the plurality of RF transmit modes comprises at least one transmit uplink carrier aggregation mode;
    during the at least one transmit uplink carrier aggregation mode, provide transmit uplink carrier aggregation by simultaneously providing at least two RF transmit signals comprising a highband RF antenna transmit signal and a lowband RF antenna transmit signal, wherein a frequency of the highband RF antenna transmit signal is higher than a frequency of the lowband RF antenna transmit signal;
  operate in one of a plurality of RF receive modes, wherein the plurality of RF receive modes comprises a plurality of receive downlink carrier aggregation modes, wherein the plurality of receive downlink carrier aggregation modes comprises a dual antenna first RF diplexer receive mode, such that during the dual antenna first RF diplexer receive mode, the RF switching and duplexing circuitry is further configured to:
    receive a lowband RF antenna receive signal from the primary RF antenna via the first RF diplexer; and
    receive a highband RF antenna receive signal from the auxiliary RF antenna via the second RF diplexer;
  a first RF diplexer coupled between the RF switching and duplexing circuitry and a primary RF antenna; and
  a second RF diplexer coupled between the RF switching and duplexing circuitry and an auxiliary RF antenna, wherein RF front-end circuitry comprises the RF switching and duplexing circuitry, the first RF diplexer, and the second RF diplexer.

17. The apparatus of claim 16 wherein the plurality of receive downlink carrier aggregation modes comprises a single antenna first RF diplexer receive mode, such that during the single antenna first RF diplexer receive mode, the RF switching and duplexing circuitry is further configured to:
  receive a highband RF antenna receive signal from the primary RF antenna via the first RF diplexer; and
  receive a lowband RF antenna transmit signal from the primary RF antenna via the first RF diplexer.

18. The apparatus of claim 16 wherein the plurality of receive downlink carrier aggregation modes comprises a single antenna second RF diplexer receive mode, such that during the single antenna second RF diplexer receive mode, the RF switching and duplexing circuitry is further configured to:
  receive a highband RF antenna receive signal from the auxiliary RF antenna via the second RF diplexer; and
  receive a lowband RF antenna transmit signal from the auxiliary RF antenna via the second RF diplexer.

19. The apparatus of claim 16 wherein the plurality of RF receive modes further comprises a highband receive signal, lowband MIMO receive signal mode, such that during the highband receive signal, lowband MIMO receive signal mode, the RF switching and duplexing circuitry is further configured to receive a highband RF antenna receive signal and further receive a lowband RF MIMO antenna receive signal.

20. The apparatus of claim 16 wherein the plurality of RF receive modes further comprises a lowband receive signal, highband MIMO receive signal mode, such that during the lowband receive signal, highband MIMO receive signal mode, the RF switching and duplexing circuitry is further configured to receive a lowband RF antenna receive signal and further receive a highband RF MIMO antenna receive signal.

* * * * *